US006345113B1

United States Patent
Crawford et al.

(10) Patent No.: US 6,345,113 B1
(45) Date of Patent: Feb. 5, 2002

(54) APPARATUS AND METHOD FOR PROCESSING OBJECT DATA IN COMPUTED TOMOGRAPHY DATA USING OBJECT PROJECTIONS

(75) Inventors: Carl R. Crawford, Brookline; Ibrahim M. Bechwati, Roslindale; Sergey Simanovsky, Lynn; Muzzafer Hiraoglu, Woburn, all of MA (US)

(73) Assignee: Analogic Corporation, Peabody, MA (US)

( * ) Notice: Subject to any disclaimer, the term of this patent is extended or adjusted under 35 U.S.C. 154(b) by 0 days.

(21) Appl. No.: 09/228,379

(22) Filed: Jan. 12, 1999

(51) Int. Cl.[7] .............................. G06K 9/00; G01N 23/04
(52) U.S. Cl. .............................. 382/131; 378/57; 378/62
(58) Field of Search ........................ 382/131, 206; 378/4, 5, 15, 57, 21, 901, 62; 250/363.04

(56) References Cited

U.S. PATENT DOCUMENTS

| | | | | |
|---|---|---|---|---|
| 4,547,893 A | * | 10/1985 | Gordon | 378/19 |
| 4,677,554 A | * | 6/1987 | Dobbs et al. | 364/414 |
| 5,119,817 A | * | 6/1992 | Allen | 128/653.1 |
| 5,182,764 A | * | 1/1993 | Peschmann et al. | 378/57 |
| 5,228,443 A | * | 7/1993 | Tatar | 128/653.2 |
| 5,283,837 A | * | 2/1994 | Wood | 382/6 |
| 5,305,430 A | * | 4/1994 | Glassner | 395/127 |
| 5,317,652 A | * | 5/1994 | Chatterjee | 382/49 |
| 5,319,547 A | * | 6/1994 | Krug et al. | 364/409 |
| 5,367,552 A | * | 11/1994 | Peschmann | 378/57 |
| 5,442,672 A | * | 8/1995 | Bjorkholm et al. | 378/4 |
| 5,600,700 A | * | 2/1997 | Krug et al. | 378/57 |
| 5,712,926 A | * | 1/1998 | Eberhard et al. | 382/205 |
| 5,832,055 A | * | 11/1998 | Dewaele | 378/62 |
| 5,839,440 A | * | 11/1998 | Liou et al. | 128/654 |
| 5,883,933 A | * | 3/1999 | Goto et al. | 378/62 |
| 5,923,331 A | * | 7/1999 | Dusseux et al. | 345/421 |
| 6,049,623 A | * | 4/2000 | Fuderer et al. | 382/131 |

OTHER PUBLICATIONS

Three–Dimensional Biomedical Imaging, vol. II, Robb ed., CRC Press, 1985, pp. 127–128.*
Ney et al., "Volumetric rendering of computed tomography data: principles and techniques", IEEE Computer Graphics and Applications, Mar. 1990.*
Horn, Berthold Klaus Paul, "Robot Vision," by The MIT Press, Cambridge, Massachusetts, 1986 pp. 44–64.
Weinshall, Daphna, "On View Likelihood and Stability," IEEE Transactions on Pattern Analysis and Machine Intelligence, vol. 19, No. 2, Feb. 1997, pp. 97–108.

* cited by examiner

Primary Examiner—Amelia M. Au
Assistant Examiner—Martin Miller
(74) Attorney, Agent, or Firm—McDermott, Will & Emery

(57) ABSTRACT

An apparatus and method for identifying and classifying objects represented in CT data for a region using the shape of the objects are disclosed. An object represented by CT data for a region is identified. Next, a two-dimensional projection of the object along a principal axis of the object is generated. The principal axis can be identified by computing eigenvectors of a covariance matrix of spatial locations of voxels in the CT data that are associated with the object. The smallest eigenvector can be selected as the principal axis of the object along which the two-dimensional projection is generated. The identification of the object can be used in the classification of the object such as by altering one or more discrimination parameters.

6 Claims, 6 Drawing Sheets

APPARATUS AND METHOD FOR PROCESSING OBJECT DATA IN COMPUTED TOMOGRAPHY DATA USING OBJECT PROJECTIONS

RELATED APPLICATIONS

This application is related to the following copending U.S. applications, of the same assignee as the present application, the contents of which are incorporated herein in their entirety by reference.

"Nutating Slice CT Image Reconstruction Apparatus and Method," invented by Gregory L. Larson, et al., U.S. application Ser. No. 08/831,558, filed on Apr. 9, 1997, which issued on Sep. 1, 1998 as U.S. Pat. No. 5,802,134;

"Computed Tomography Scanner Drive System and Bearing," invented by Andrew P. Tybinkowski, et al., U.S. application Ser. No. 08/948,930, filed on Oct. 10, 1997 now U.S. Pat. No. 5,982,844, issued Nov. 9, 1999;

"Air Calibration Scan for Computed Tomography Scanner with Obstructing Objects," invented by David A. Schafer, et al., U.S. application Ser. No. 08/948,937, filed on Oct. 10, 1997 now U.S. Pat. No. 5,949,842, issued Sep. 7, 1999;

"Computed Tomography Scanning Apparatus and Method With Temperature Compensation for Dark Current Offsets," invented by Christopher C. Ruth, et al., U.S. application Ser. No. 08/948,928, filed on Oct. 10, 1997 now U.S. Pat. No. 5,970,113, issued Oct. 19, 1999;

"Computed Tomography Scanning Target Detection Using Non-Parallel Slices," invented by Christopher C. Ruth, et al., U.S. application Ser. No. 08/948,491, filed on Oct. 10, 1997 now U.S. Pat. No. 5,909,477, issued Jun. 1, 1999;

"Computed Tomography Scanning Target Detection Using Target Surface Normals," invented by Christopher C. Ruth, et al., U.S. application Ser. No. 08/948,929, filed on Oct. 10, 1997 now U.S. Pat. No. 5,901,198, issued May 4, 1999;

"Parallel Processing Architecture for Computed Tomography Scanning System Using Non-Parallel Slices," invented by Christopher C. Ruth, et al., U.S. application Ser. No. 08/948,697, filed on Oct. 10, 1997 now U.S. Pat. No. 5,887,047, issued Mar. 23, 1999;

"Computed Tomography Scanning Apparatus and Method For Generating Parallel Projections Using non-Parallel Slice Data," invented by Christopher C. Ruth, et al., U.S. application Ser. No. 08/948,492, filed on Oct. 10, 1997 now U.S. Pat. No. 5,881,122, issued Mar. 9, 1999;

"Computed Tomography Scanning Apparatus and Method Using Adaptive Reconstruction Window," invented by Bernard M. Gordon, et al., U.S. application Ser. No. 08/949,127, filed on Oct. 10, 1997.

"Area Detector Array for Computed Tomography Scanning System," invented by David A. Schafer, et al., U.S. application Ser. No. 08/948,450, filed on Oct. 10, 1997 now U.S. Pat. No. 6,091,795, issued Jul. 18, 2000;

"Closed Loop Air Conditioning System for a Computed Tomography Scanner," invented by Eric Bailey, et al., U.S. application Ser. No. 08/948,692, filed on Oct. 10, 1997 now U.S. Pat. No. 5,982,843, issued Nov. 9, 1999;

"Measurement and Control System for Controlling System Functions as a Function of Rotational Parameters of a Rotating Device," invented by Geoffrey A. Legg, et al., U.S. application Ser. No. 08,948,493, filed on Oct. 10, 1997 now U.S. Pat. No. 5,932,874, issued Aug. 3, 1999;

"Rotary Energy Shield for Computed Tomography Scanner," invented by Andrew P. Tybinkowski, et al., U.S. application Ser. No. 08/948,698, filed on Oct. 10, 1997 now U.S. Pat. No. 5,937,028, issued Aug. 10, 1999;

"Apparatus and Method for Detecting Sheet Objects in Computed Tomography Data," invented by Muzaffer Hiraoglu, et al., U.S. application Ser. No. 09/022,189, filed on Feb. 11, 1998;

"Apparatus and Method for Eroding Objects in Computed Tomography Data," invented by Sergey Simanovsky, et al., U.S. application Ser. No. 09/021,781, filed on Feb. 11, 1998 now U.S. Pat. No. 6,075,871, issued Jun. 13, 2000;

"Apparatus and Method for Combining Related Objects in Computed Tomography Data," invented by Ibrahim M. Bechwati, et al., U.S. application Ser. No. 09/022,060, filed on Feb. 11, 1998;

"Apparatus and Method for Detecting Sheet Objects in Computed Tomography Data," invented by Sergey Simanovsky, et al., U.S. application Ser. No. 09/022,165, filed on Feb. 11, 1998 now U.S. Pat. No. 6,026,143, issued Feb. 15, 2000;

"Apparatus and Method for Classifying Objects in Computed Tomography Data Using Density Dependent Mass Thresholds," invented by Ibrahim M. Bechwati, et al., U.S. application Ser. No. 09/021,782, filed on Feb. 11, 1998 now U.S. Pat. No. 6,076,400, issued Jun. 20, 2000;

"Apparatus and Method for Correcting Object Density in Computed Tomography Data," invented by Ibrahim M. Bechwati, et al., U.S. application Ser. No. 09/022,354, filed on Feb. 11, 1998;

"Apparatus and Method for Density Discrimination of Objects in Computed Tomography Data Using Multiple Density Ranges," invented by Sergey Simanovsky, et al., U.S. application Ser. No. 09/021,889, now U.S. Pat. No. 6,078,642, issued Jun. 20, 2000; filed on Feb. 11, 1998;

"Apparatus and Method for Detection of Liquids in Computed Tomography Data," invented by Muzaffer Hiraoglu, et al., U.S. application Ser. No. 09/022,064, filed on Feb. 11, 1998 now U.S. Pat. No. 6,026,171, issued Feb. 15, 2000;

"Apparatus and Method for Optimizing Detection of Objects in Computed Tomography Data," invented by Muzaffer Hiraoglu, et al., U.S. application Ser. No. 09/022, 062, filed on Feb. 11, 1998;

"Multiple-Stage Apparatus and Method for Detecting Objects in Computed Tomography Data," invented by Muzaffer Hiraoglu, et al., U.S. application Ser. No. 09/022, 164 filed on Feb. 11, 1998 now U.S. Pat. No. 6,035,014, issued Mar. 7, 2000;

"Computed Tomography Apparatus and Method for Classifying Objects," invented by Sergey Simanovsky, et al., U.S. application Ser. No. 09/022,059, filed on Feb. 11, 1998;

"Apparatus and Method for Detecting Objects in Computed Tomography Data Using Erosion and Dilation of Objects," invented by Sergey Simanovsky, et al., U.S. application Ser. No. 09/022,204, filed on Feb. 11, 1998 now U.S. Pat. No. 6,067,366, issued May 23, 2000; and "Apparatus and Method for Detecting Concealed Objects in Computed Tomography Data," invented by Sergey Simanovsky, et al., filed on even date herewith, U.S. application Ser. No. 09/228,380, filed Jan. 12, 1999; now U.S. Pat. No. 6,195,444.

FIELD OF THE INVENTION

The present invention relates generally to computed tomography (CT) scanners and more specifically to a target detection apparatus and method in a baggage scanning system which utilizes CT technology.

BACKGROUND OF THE INVENTION

Various X-ray baggage scanning systems are known for detecting the presence of explosives and other prohibited items in baggage or luggage prior to loading the baggage onto a commercial aircraft. Since many explosive materials may be characterized by a range of densities differentiable from that of other items typically found in baggage, explosives are generally amenable to detection by X-ray equipment. A common technique of measuring a material's density is to expose the material to X-rays and to measure the amount of radiation absorbed by the material, the absorption being indicative of the density.

A system using computed tomography (CT) technology typically includes a CT scanner of the third generation type, which typically includes an X-ray source and an X-ray detector system secured to diametrically opposite sides of an annular-shaped platform or disk. The disk is rotatably mounted within a gantry support so that in operation the disk continuously rotates about a rotation axis while X-rays pass from the source through an object positioned within the opening of the disk to the detector system.

The detector system can include an array of detectors disposed as one or more rows in the shape of a circular arc having a center of curvature at the focal spot of the X-ray source, i.e., the point within the X-ray source from which the X-rays emanate. The X-ray source generates a fan-shaped beam, or fan beam, or cone beam of X-rays that emanates from the focal spot, passes through a planar imaging field, and is received by the detectors. The CT scanner includes a coordinate system defined by X-, Y- and Z-axes, wherein the axes intersect and are all normal to one another at the center of rotation of the disk as the disk rotates about the rotation axis. This center of rotation is commonly referred to as the "isocenter." The Z-axis is defined by the rotation axis and the X- and Y-axes are defined by and lie within the planar imaging field. The fan beam is thus defined as the volume of space defined between a point source, i.e., the focal spot, and the receiving surfaces of the detectors of the detector array exposed to the X-ray beam. Because the dimension of the receiving surfaces of the linear array of detectors is relatively small in the Z-axis direction the fan beam is relatively thin in that direction. Each detector generates an output signal representative of the intensity of the X-rays incident on that detector. Since the X-rays are partially attenuated by all the mass in their path, the output signal generated by each detector is representative of the density of all the mass disposed in the imaging field between the X-ray source and that detector.

As the disk rotates, the detector array is periodically sampled, and for each measuring interval each of the detectors in the detector array generates an output signal representative of the density of a portion of the object being scanned during that interval. The collection of all of the output signals generated by all the detectors of the array for any measuring interval is referred to as a "projection," and the angular orientation of the disk (and the corresponding angular orientations of the X-ray source and the detector array) during generation of a projection is referred to as the "projection angle." At each projection angle, the path of the X-rays from the focal spot to each detector, called a "ray," increases in cross section from a point source to the receiving surface area of the detector, and thus is thought to magnify the density measurement because the receiving surface area of the detector area is larger than any cross sectional area of the object through which the ray passes.

As the disk rotates around the object being scanned, the scanner generates a plurality of projections at a corresponding plurality of projection angles. Using well known algorithms, a CT image of the object may be generated from all the projection data collected at each of the projection angles. The CT image is representative of the density of a two dimensional "slice" of the object through which the fan beam has passed during the rotation of the disk through the various projection angles. The resolution of the CT image is determined in part by the width of the receiving surface area of each detector in the plane of the fan beam, the width of the detector being defined herein as the dimension measured in the same direction as the width of the fan beam, while the length of the detector is defined herein as the dimension measured in a direction normal to the fan beam parallel to the rotation or Z-axis of the scanner.

Baggage scanners using CT techniques have been proposed. One approach, described in U.S. Pat. No. 5,182,764 (Peschmann et al.) and U.S. Pat. No. 5,367,552 (Peschmann et al.) (hereinafter the '764 and '552 patents), has been commercially developed and is referred to hereinafter as the "In Vision Machine." The In Vision Machine includes a CT scanner of the third generation type, Which typically include an X-ray source and an X-ray detector system secured respectively to diametrically opposite sides of an annular-shaped platform or disk. The disk is rotatably mounted within a gantry support so that in operation the disk continuously rotates about a rotation axis while X-rays pass from the source through an object positioned within the opening of the disk to the detector system.

One important design criterion for a baggage scanner is the speed with which the scanner can scan an item of baggage. To be of practical utility in any major airport, a baggage scanner should be capable of scanning a large number of bags at a very fast rate. One problem with the In Vision Machine is that CT scanners of the type described in the '764 and '552 patents take a relatively long time, e.g., from about 0.6 to about 2.0 seconds, for one revolution of the disk to generate the data for a single sliced CT image. Further, the thinner the slice of the beam through the bag for each image, the better the resolution of the image. The CT scanner should provide images of sufficient resolution to detect plastic explosives on the order of only a few millimeters thick. Therefore, to provide adequate resolution, many revolutions are required. To meet high baggage throughput rates, a conventional CT baggage scanner such as the In Vision Machine can only afford to generate a few CT images per bag. Clearly, one cannot scan the entire bag within the time allotted for a reasonably fast throughput. Generating only a few CT images per baggage items leaves most of the item unscanned and therefore does not provide scanning adequate to identify all potential threat objects in the bag, such as sheets of explosive material.

To improve throughput, the In Vision Machine uses a pre-screening process which produces a two-dimensional projection image of the entire bag from a single angle. Regions of the projection identified as potentially containing threat items can then be subjected to a full scan or manual inspection. With this pre-screening and selective region scanning approach, the entire bag is not scanned, thus allowing potential threat items to pass through undetected. This is especially true in the case of sheet items oriented transversely to the direction of propagation of the radiation used to form the pre-screen projection and where the sheet covers a relatively large portion of the area of the bag.

It would be beneficial for the baggage scanning equipment to automatically analyze the acquired density data and determine if the data indicate the presence of any contraband items, e.g., explosives. This automatic explosive detection process should have a relatively high detection rate such that the chances of missing an explosive in a bag are small. At the same time, the false alarm rate of the system should be relatively low to substantially reduce or eliminate false alarms on innocuous items. Because of practical considerations of baggage throughput at large commercial airports, a high false alarm rate could reduce system performance speed to a prohibitively low rate. Also, it would be beneficial to implement a system which could distinguish among the different types of explosive, e.g., powders, bulks, sheets, etc., such that a detected threat can be more accurately characterized.

In the assignee's CT baggage scanning system as described and claimed in the U.S. patent applications listed above and incorporated herein by reference, threat items such as explosives are identified and classified in general by analyzing mass and/or density of identified objects. Voxels in CT data for a piece of baggage are associated with density values. Voxels having density values within certain predetermined ranges of density can be identified and grouped together as objects. Using voxel volumes and densities, masses of identified objects are computed and are compared to mass thresholds. Analysis of this comparison and other predetermined parameters is used to determine whether the identified object can be classified as a threat object, i.e., an explosive.

In the assignee's system, a set of two-dimensional slices generated by the scanning system is automatically processed to locate threat objects. The processing generally includes three steps. First, each of the voxels is examined to determine if it could be part of a threat object. The main criterion used in making this determination is the density of the voxel. Next, a connected components labeling (CCL) approach is used to assemble the identified voxels into volumes. Finally, discrimination is used to determine if the assembled voxels can be classified as a threat object. The main criteria used in this discrimination step are mass and density.

As with any other automatic identification system, false alarms on innocuous items can be generated. Also, because, like all systems, the assignee's system has an imperfect detection rate, some threat objects may not be detected, particularly where the threat objects are concealed in or near otherwise innocuous items.

SUMMARY OF THE INVENTION

The present invention is directed to an object identification and/or discrimination apparatus and method, and a CT baggage scanning system and method which use the same. The invention can be used, for example, with the CT baggage system described and claimed in the U.S. patent applications listed above and incorporated herein by reference.

In accordance with the invention, a plurality of volume elements or voxels in the CT data for a region, each of which is associated with a density value, are identified. The region can include at least a portion of the inside of a container and/or a portion of the container itself. The container can be, for example, a piece of baggage or luggage. A plurality of object volume elements in the CT data associated with an object in the region are also identified. An axis of the object is then identified. To aid in identifying the object, a two-dimensional projection of the object is generated in a plane that is associated with the identified axis of the object.

In one embodiment, the axis of the object is a principal axis of the object defined by an eigenvector associated with the object. The eigenvector is computed from a covariance matrix for spatial locations of the voxels of the object. An eigenvalue of the covariance matrix is computed, and the eigenvector that defines the principal axis of the object is the eigenvector that is associated with the determined eigenvalue. In one embodiment, the plane in which the two-dimensional projection is generated is a plane orthogonal to the eigenvector of the covariance matrix.

In one embodiment, three mutually orthogonal axes of the object are identified. These axes can be principal axes defined by eigenvectors associated with the object, which are computed from a covariance matrix of spatial locations of the voxels of the object. The eigenvectors that define the principal axes of the object are the eigenvectors associated with the eigenvalues of the covariance matrix. In one embodiment, the plane in which the two-dimensional projection is generated is a plane orthogonal to the eigenvector associated with the smallest eigenvalue of the covariance matrix, which is referred to herein as the smallest eigenvector of the convariance matrix. Because it is generated with respect to eigenvectors, the two-dimensional projection is referred to herein as an "eigen projection."

In an alternative embodiment, the plane in which the two-dimensional projection is generated is not related to eigenvectors. In this embodiment, the plane of the two-dimensional projection is selected as the plane which contains the two-dimensional projection of the object with the largest area. In one embodiment, this plane is identified by searching solid angles over a hemisphere defined in the region for which the CT data have been obtained.

In accordance with the invention, the two-dimensional projection is analyzed to alter the discrimination process of the CT baggage scanning system in which it is being used. The two-dimensional projection can be used to identify the object or a class of objects to which a selected object belongs. This analysis adds a discrimination factor based on identification of objects detected in the CT data. By improving the ability to identify objects, this approach has a tendency to reduce false alarms of the system and also increase detection rate of the system.

In accordance with the invention, the two-dimensional projection is used to provide an indication of the identity or class of a detected object. The projection can be compared to shapes of various objects by any of various well-known procedures. For example, a template matching process can be applied to the two-dimensional projection to identify the object. The identification of the object can be used to alter discrimination parameters. For example, if a particularly common innocuous item is identified, discrimination parameters can be altered to more readily clear the item as a non-threat. Additionally, or alternatively, when a particular type of item is identified, the region adjacent to the item can be examined more closely to identify features which would increase the likelihood that the object would be classified as a threat. For example, the region adjacent to the object may contain an item such as an explosive detonator. In this case, discrimination parameters can be altered to allow the item to be classified as a threat. The two-dimensional projection is defined by a plurality of projection picture elements or pixels. In one embodiment, each projection pixel is assigned a density value based on the number of object voxels above or below the projection pixel in the direction perpendicular to the plane of the two-dimensional projection, which, in one embodiment, is in the direction of the principal axis of the object or the smallest eigenvector of the covariance matrix generated for the object. In one embodiment, the value assigned to a projection pixel is related to a count of the number of voxels above or below the projection pixel in that direction. In one embodiment, the contribution of each object voxel to the count for a particular projection pixel can be weighted by the density value of the object voxel. Therefore, in the two-dimensional projection, pixels formed by projecting more dense portions of the object will have greater density.

In one embodiment, as mentioned above, the two-dimensional projection can be analyzed to identify the object and/or alter one or more discrimination parameters based on the object identification associated with the two-dimensional projection. The two-dimensional projection can also be presented on a video display to permit the operator to manually identify and/or classify the object.

Further visual analysis of the object can be performed in accordance with the invention by displaying various slices through the object taken at selected angles. For example, a cross-sectional view of the object can be displayed by producing a slice image taken along a plane perpendicular to the plane in which the two-dimensional projection is generated. In many cases, this view amounts to a cross-sectional view along the long axis of the object. This can further aid in identification of the object and/or classifying the object as to whether it poses it threat.

The present invention provides an approach to processing CT data which uses two-dimensional object projections to identify, classify and/or discriminate objects. When used in a system such as a CT baggage scanning system, the invention substantially enhances the performance characteristics of the system. By adding object projection analysis to considerations of mass and density, discrimination can be improved such that false alarms on innocuous items can be substantially reduced. The detection rate, that is, the rate at which threat items are identified and classified by the system, can also be improved.

The approach of the invention reduces the dimensionality of the three-dimensional CT data acquired for the region being analyzed to two dimensions. The two-dimensional projections thus obtained are more readily analyzed to produce an object identification that can be used to enhance the performance of subsequent discrimination steps. The two-dimensional projection provides object data in which properties and features of the object are more pronounced than they would be in three-dimensional space. As such, these properties and features can be more readily used to identify objects and perform more accurate discrimination. Also, the two-dimensional data is more readily adaptable for display and manual identification than the three-dimensional data.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS OF THE INVENTION

The present invention provides an apparatus and method which detect, identify and/or classify objects in CT data for a region. The region can include the interior of a piece of baggage or luggage, and/or a portion of the baggage or luggage itself, being carried or checked onto a commercial aircraft. The invention can therefore be implemented in a CT baggage scanning system. The objects identified by the invention can be objects known to pose threats to persons at an airport or on board an aircraft. These objects can include explosive objects and materials. The invention is specifically directed to an approach to using considerations of a two-dimensional projection of a detected object in the determination as to whether the object poses a threat.

Throughout the following description, it is noted that many thresholds, such as density thresholds, mass thresholds, density-dependent mass thresholds, and difference thresholds as well as process parameters, are used to carry out the various object identification and discrimination functions of the CT baggage scanning system to which the invention is applied. These thresholds and parameters are determined based on extensive analysis of CT data, such as actual three-dimensional CT density data, for many actual threat and non-threat objects. This analysis includes statistical analysis of the data employing statistical methods such as simulated annealing and genetic algorithms. In accordance with the invention, this analysis allows for threshold and/or parameter selection based on a particular objective to be met, e.g., false alarm and/or detection rate setting/optimization, discrimination of explosive type, etc.

Figure 1:
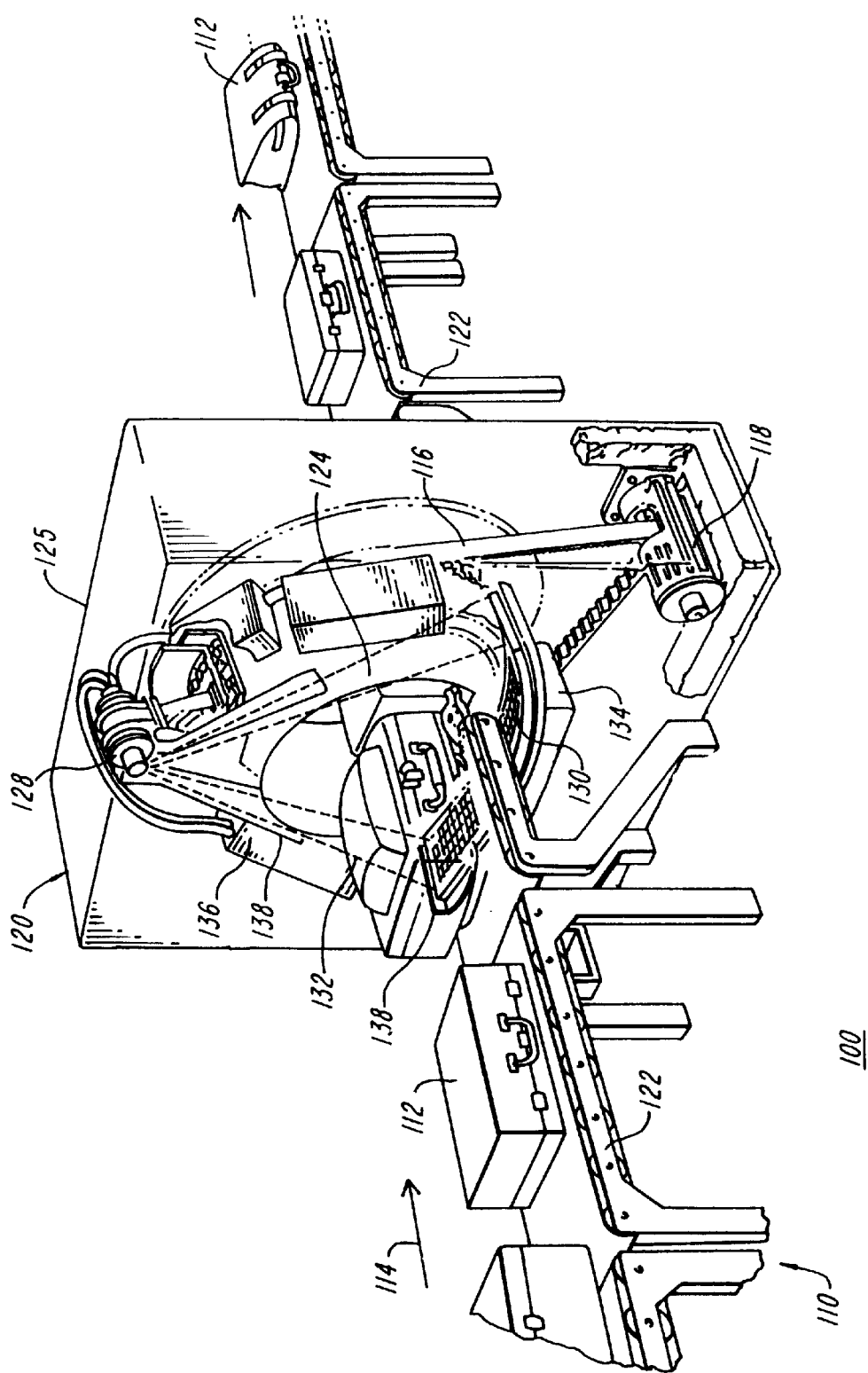
FIG. 1 contains a perspective view of a baggage scanning system in accordance with the present invention.
Figure 2:
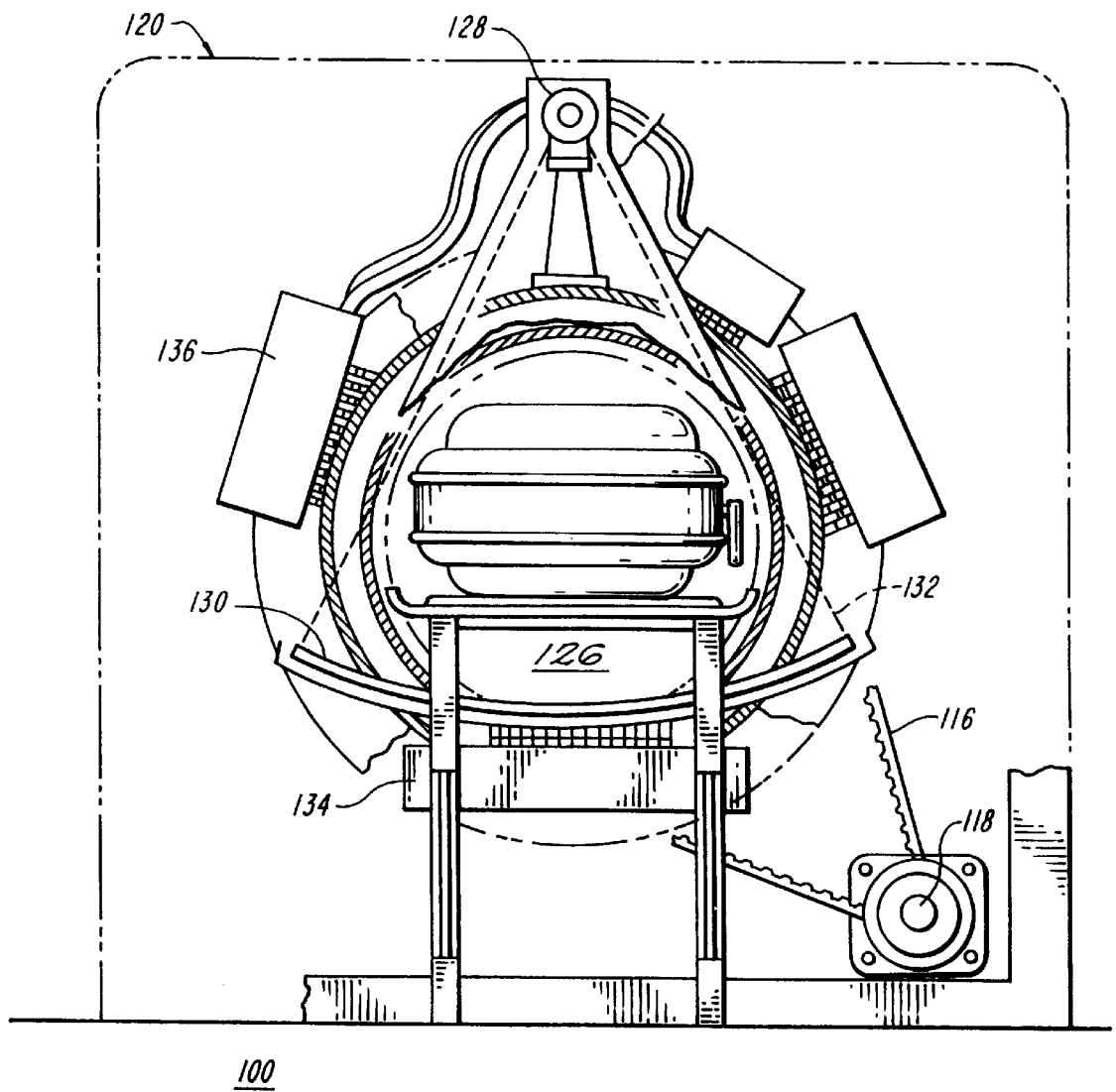
FIG. 2 contains a cross-sectional end view of the system shown in FIG. 1.
Figure 3:
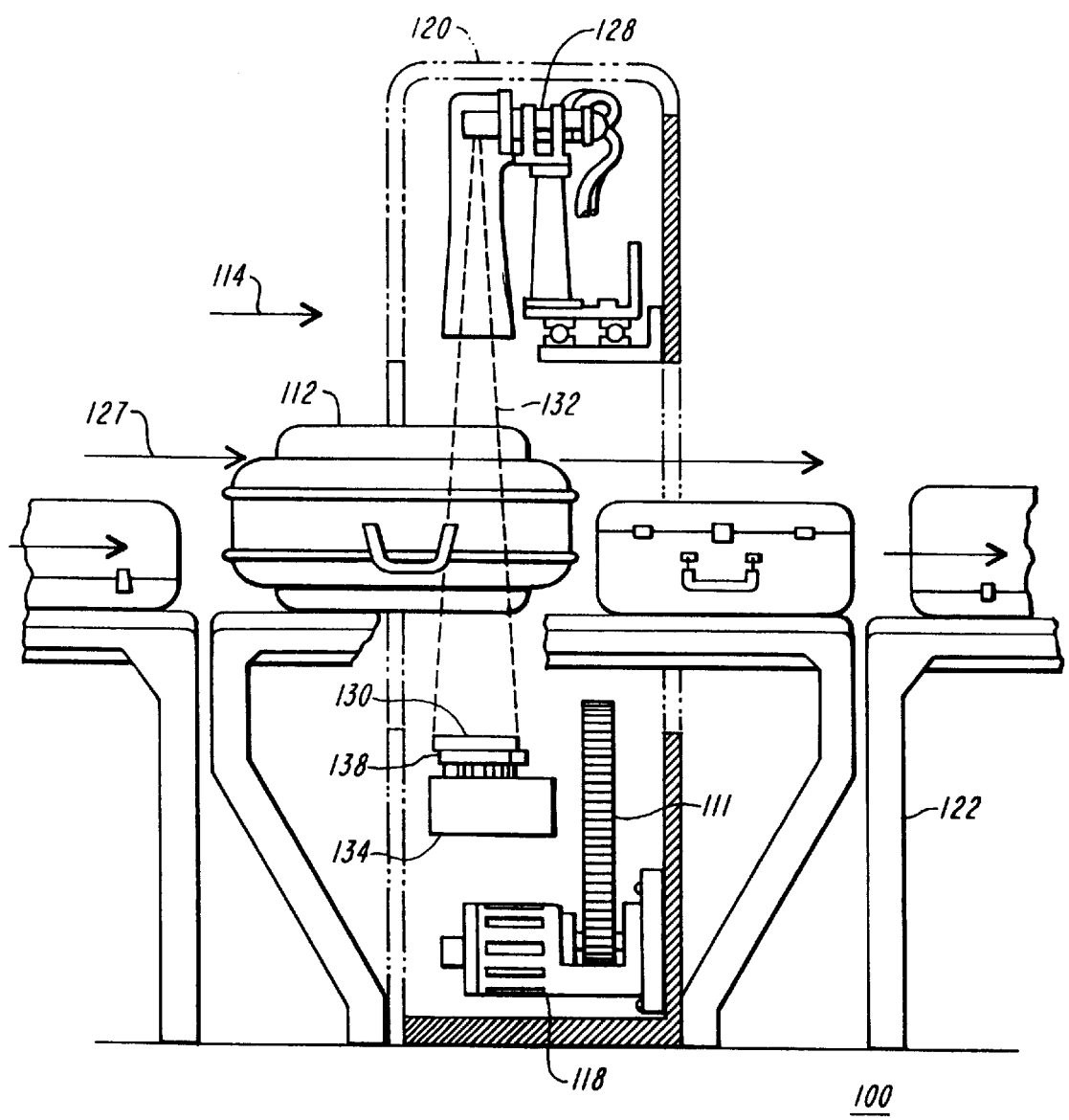
FIG. 3 contains a cross-sectional radial view of the system shown in FIG. 1.

FIGS. 1, 2 and 3 contain perspective, end cross-sectional and radial cross-sectional views, respectively, of a baggage scanning system 100 constructed in accordance with the invention, which provides object detection, identification, classification and/or discrimination in accordance with the invention. The baggage scanning system 100 generates CT data for a region which can include a piece of baggage. The system can use the CT data to generate image volume elements or "voxels" for the region. The baggage scanning system can be of the type described in the U.S. patent applications listed above and incorporated herein by reference.

The system 100 includes a conveyor system 110 for continuously conveying baggage or luggage 112 in a direction indicated by arrow 114 through a central aperture of a CT scanning system 120. The conveyor system includes motor driven belts for supporting the baggage. Conveyor system 110 is illustrated as including a plurality of individual conveyor sections 122; however, other forms of conveyor systems may be used.

The CT scanning system 120 includes an annular shaped rotating platform or disk 124 disposed within a gantry support 125 for rotation about a rotation axis 127 (shown in FIG. 3) that is preferably parallel to the direction of travel 114 of the baggage 112. Disk 124 is driven about rotation axis 127 by any suitable drive mechanism, such as a belt 116 and motor drive system 118, or other suitable drive mechanism, such as the one described in U.S. Pat. No. 5,473,657 issued Dec. 5, 1995 to Gilbert McKenna, entitled "X-ray Tomographic Scanning System," (Attorney Docket No. ANA- 30CON) which is assigned to the assignee of the present application and which is incorporated herein in its entirety by reference. Rotating platform 124 defines a central aperture 126 through which conveyor system 110 transports the baggage 112.

The system 120 includes an X-ray tube 128 and a detector array 130 which are disposed on diametrically opposite sides of the platform 124. The detector array 130 can be a two-dimensional array such as the array described in a copending U.S. patent application Ser. No. 08/948,450 entitled, "Area Detector Array for Computed Tomography Scanning System," (Attorney Docket No. ANA-137) filed on Oct. 10, 1997. The system 120 further includes a data acquisition system (DAS) 134 for receiving and processing CT data signals generated by detector array 130, and an X-ray tube control system 136 for supplying power to, and otherwise controlling the operation of, X-ray tube 128. The system 120 is also preferably provided with a computer processing system for processing the output of the data acquisition system 134 and for generating the necessary signals for operating and controlling the system 120. The computer system can also include a monitor for displaying information including generated images. The X-ray tube control system 136 can be a dual-energy X-ray tube control system such as the dual-energy X-ray tube control system described in U.S. Pat. No. 5,661,774, issued on Aug. 26, 1997, entitled, "Dual Energy Power Supply," (Attorney Docket No. ANA-094), which is assigned to the same assignee as the present application and which is incorporated herein in its entirety by reference. Dual energy X-ray techniques for energy-selective reconstruction of X-ray CT images are particularly useful in indicating a material's atomic number in addition to indicating the material's density, although it is not intended that the present invention be limited to this type of control system. It is noted that the detailed description herein of the object identification and classification system and method of the invention describes the details in connection with single-energy data. It will be understood that the description is applicable to multiple-energy techniques. System 120 also includes shields 138, which may be fabricated from lead, for example, for preventing radiation from propagating beyond gantry 125.

In one embodiment, the X-ray tube 128 generates a pyramidically shaped beam, often referred to as a "cone beam," 132 of X-rays that pass through a three-dimensional imaging field, through which baggage 112 is transported by conveying system 110. After passing through the baggage disposed in the imaging field, cone beam 132 is received by detector array 130 which in turn generates signals representative of the densities of exposed portions of baggage 112. The beam therefore defines a scanning volume of space. Platform 124 rotates about its rotation axis 127, thereby transporting X-ray source 128 and detector array 130 in circular trajectories about baggage 112 as the baggage is continuously transported through central aperture 126 by conveyor system 110 so as to generate a plurality of projections at a corresponding plurality of projection angles.

In a well known manner, signals from the detector array 130 can be initially acquired by data acquisition system 134, and subsequently processed by a computerized processing system using CT scanning signal processing techniques. The processed data can be displayed on a monitor, and/or can also be further analyzed by the processing system as described in detail below to determine the presence of a suspected material. For example, the CT data can be analyzed to determine whether the data suggest the presence of material having the density (and when a dual energy system is used, molecular weight) of explosives. If such data are present, suitable means can be provided for indicating the detection of such material to the operator or monitor of the system, for example, by providing an indication on the screen of the monitor by sounding an audible or visual alarm, and/or by providing an automatic ejection device (not shown) for removing the suspect bag from the conveyor for further inspection, or by stopping the conveyor so that the suspect bag can be inspected and/or removed.

As stated above, detector array 130 can be a two-dimensional array of detectors capable of providing scan data in both the directions of the X- and Y- axes, as well as in the Z-axis direction. During each measuring interval, the plurality of detector rows of the array 130 generate data from a corresponding plurality of projections and thereby simultaneously scan a volumetric region of baggage 112. The dimension and number of the detector rows are preferably selected as a function of the desired resolution and throughput of the scanner, which in turn are a function of the rotation rate of rotating platform 124 and the speed of conveying system 110. These parameters are preferably selected so that in the time required for a single complete rotation of platform 124, conveying system 110 advances the baggage 112 just enough so that the volumetric region scanned by detector array 130 during one revolution of the platform is contiguous and non-overlapping with (or partially overlapping with) the volumetric region scanned by detector array 130 during the next revolution of the platform.

Conveying system 110 continuously transports a baggage item 112 through CT scanning system 120, preferably at constant speed, while platform 124 continuously rotates at a constant rotational rate around the baggage items as they pass through. In this manner, system 120 performs a helical volumetric CT scan of the entire baggage item. Baggage scanning assembly 100 preferably uses at least some of the data provided by the array 130 and a helical reconstruction algorithm to generate a volumetric CT representation of the entire baggage item as it passes through the system. In one embodiment, the system 100 performs a nutating slice reconstruction (NSR) on the data as described in U.S. Pat. No. 5,802,134, issued on Sep. 1, 1998, entitled, "Nutating Slice CT Image Reconstruction Apparatus and Method," (Attorney Docket No. ANA-118). The system 100 thus provides a complete CT scan of each bag, rather than only providing CT scanning of selected portions of baggage items, without the need for a pre-screening device. The system 100 also provides rapid scanning since two-dimensional detector array 130 allows the system 100 to simultaneously scan a relatively large portion of each baggage item with each revolution of the platform 124.

Figure 4:
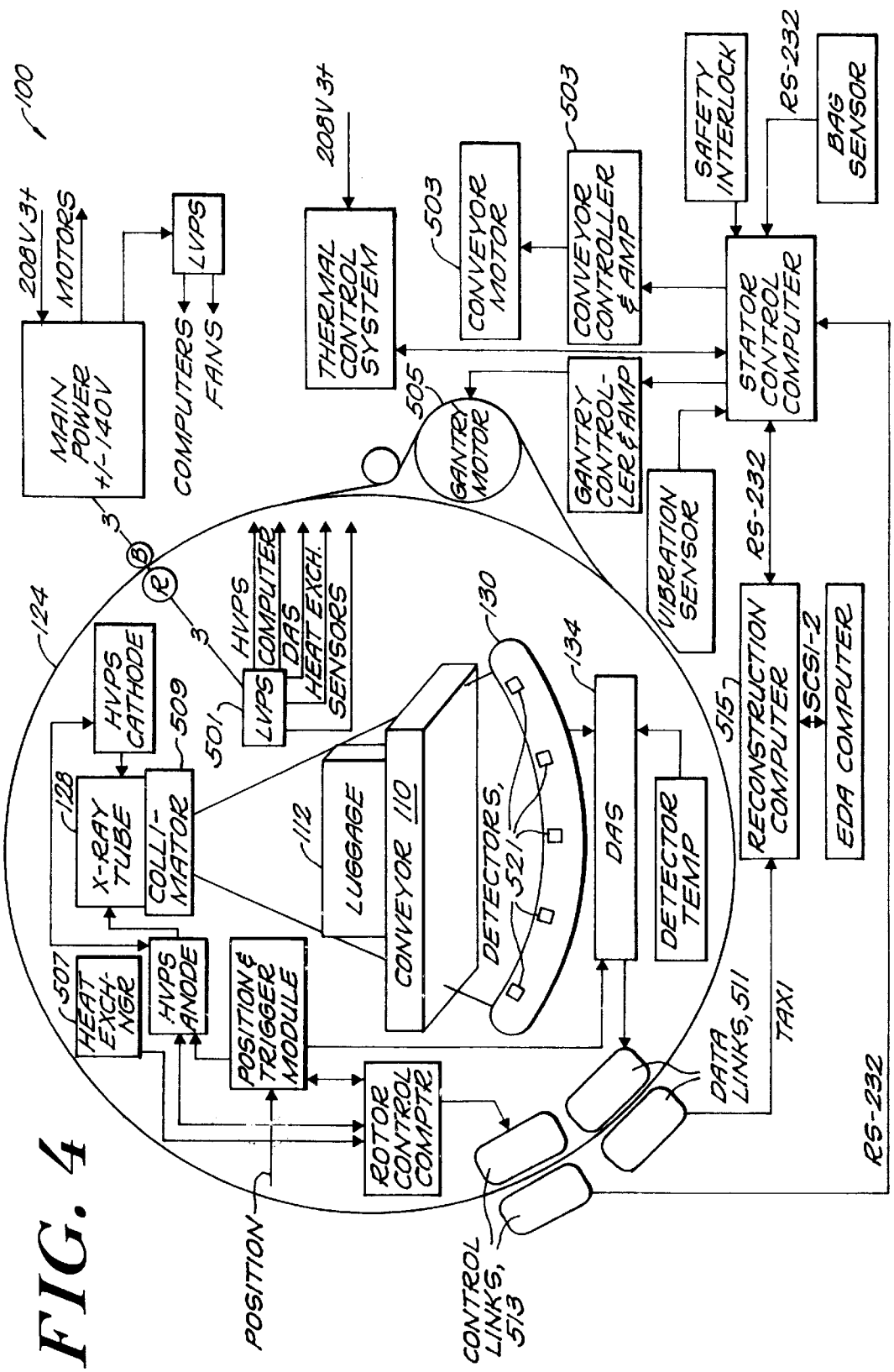
FIG. 4 contains a schematic electrical and mechanical block diagram of one embodiment of the baggage scanner of the invention.

FIG. 4 contains a mechanical/electrical block diagram of one embodiment of the baggage scanning system 100 of the invention. The mechanical gantry of the scanner 100 includes two major components, the disk 124 and the frame (not shown). The disk 124 is the rotational element which carries the X-ray assembly, the detector assembly 130, the data acquisition system (DAS) 134, a high-voltage power supply and portions of the monitor/control assembly, the power supply assembly and the data link assembly. The frame supports the entire system 100, including the baggage handling conveyor system 110. The disk 124 is mechanically connected to the frame via a duplex angular contact ball bearing cartridge. The disk 124 can be rotated at a constant rate by a belt which can be driven by a DC servomotor 505. The gantry also contains X-ray shielding on the disk and frame assemblies.

In one embodiment, the baggage conveyor system 110 includes a single belt driven at a constant rate to meet specified throughput requirements. The belt can be driven by a high-torque, low-speed assembly to provide a constant speed under changing load conditions. A low-attenuation carbon graphite epoxy material can be used for the portion of the conveyor bed in the X-ray. The total length of the conveyor is designed to accommodate three average length bags. A tunnel is used around the conveyor to meet the appropriate safety requirements of a cabinet X-ray system.

In one embodiment, input power of 208 volts, 3-phase, 30 amps services as the main supply which can provide power for the entire system. This input power can be supplied by the airport at which the system is installed. Power is transferred from the frame through a series of frame brushes which make continuous contact with the metal rings mounted to the disk 124. The low-voltage power supply 501 on the disk 124 provides power for the DAS 134, the X-ray cooling system and the various monitor/control computers and electronics. A low-voltage power supply on the frame provides power for the reconstruction computer and the various monitor/control electronics. The conveyor motor 503, the gantry motor 505, the high-voltage power supply and the X-ray coolant pump can all be supplied power directly from the main supply.

The high-voltage power supply provides power to the X-ray tube 128. The supply can provide a dual voltage across the cathode/anode. The driving waveform can be any desirable shape, and preferably is in the form of a sine wave. This supply can also provide X-ray filament power. The supply current can be held approximately constant for both voltages.

The dual-energy X-rays strike the baggage, and some portion of the X-rays pass through and strike the detector assembly 130. The detector assembly 130 performs an analog conversion from X-ray to visible photons and then to electrical current. The DAS 134 can sample the detector currents, multiplex the amplified voltages to a set of 16-bit analog-to-digital converters and multiplex the digital outputs to the computerized processing system 515, which generates CT data and processes the data in accordance with the invention as described below to detect, identify and classify objects in the piece of baggage 112. In one embodiment, the digital data from the DAS 134 are transferred to the processing system 515 via a non-contact serial data link 511. The DAS 134 can be triggered by the angular position of the disk 124.

The non-contact links 511 and 513 can transfer the high-speed digital DAS data to the processing system 515 and the low-speed monitor/control signals back and forth between the disk and frame control computers. The data link 511 can be based upon an RF transmitter and receiver.

In one embodiment, the image reconstructor portion of the processing system 515 converts the digital line integrals from the DAS 134 into a set of two-dimensional images of bag slices for both the high and low energies. The CT reconstruction can be performed via a helical-cone-beam solution, such as the nutating slice reconstruction method described in U.S. Pat. No. 5,802,134. The reconstructor can include embedded software, a high-speed DAS port, an array processor, a DSP-based convolver, an ASIC-based backprojector, image memory, UART control port, and a SCSI output port for image data. The array processor can perform data corrections and interpolation. The reconstructor can be self-hosted and can tag images based upon the baggage information received over the UART interface to the frame computer.

The processing system 515 can include a PC-based embedded control system. All subsystems can be monitored for key health and status information. This system can also control both motion systems, can sense baggage information, can control the environment, e.g., temperature, humidity, etc., can sense angular position of the disk 124 and can trigger the DAS and HVPS. This system can also have a video and keyboard interface for engineering diagnostics and control. Additionally, a control panel can be included for field service.

Most types of explosive objects can be grouped into a number of categories which can be based upon their shapes and/or constituent materials. For example, categories can include sheets, sticks, bulks and other categories based on shapes. Certain types of materials can be subdivided into subtypes which can also be based on containers such as cylinders. These categories have different typical features, such as shape, size, mass or density.

In accordance with the object detection method and apparatus of the invention, a set of two-dimensional slices generated by the baggage scanning system is automatically processed to locate threat objects, i.e., explosives. The process generally includes three steps. First, the voxels are examined to determine if they could be part of an explosive. The main criterion used at this point is density. Second, connected components labeling (CCL) is used to assemble the identified voxels into volumes. Finally, discrimination is used to determine if the assembled voxels could be a threat object. The main criteria used in the discrimination step are mass and density. In general, the present invention adds additional discrimination steps to the mass and density considerations to allow for more accurate object discrimination and resulting improvement in false alarm and detection characteristics of the system.

The basic steps of a method in accordance with one aspect of the invention include sheet explosive detection, bulk explosive detection, and discrimination. In one embodiment, the sheet detection and bulk detection can be performed respectively along two parallel paths. In one embodiment, sheet explosive detection is based on a process known as a constant false alarm rate method (CFAR) which statistically decides whether a voxel belongs to a sheet explosive. The voxels identified as sheet voxels are then connected and labeled using CCL.

Figure 5:
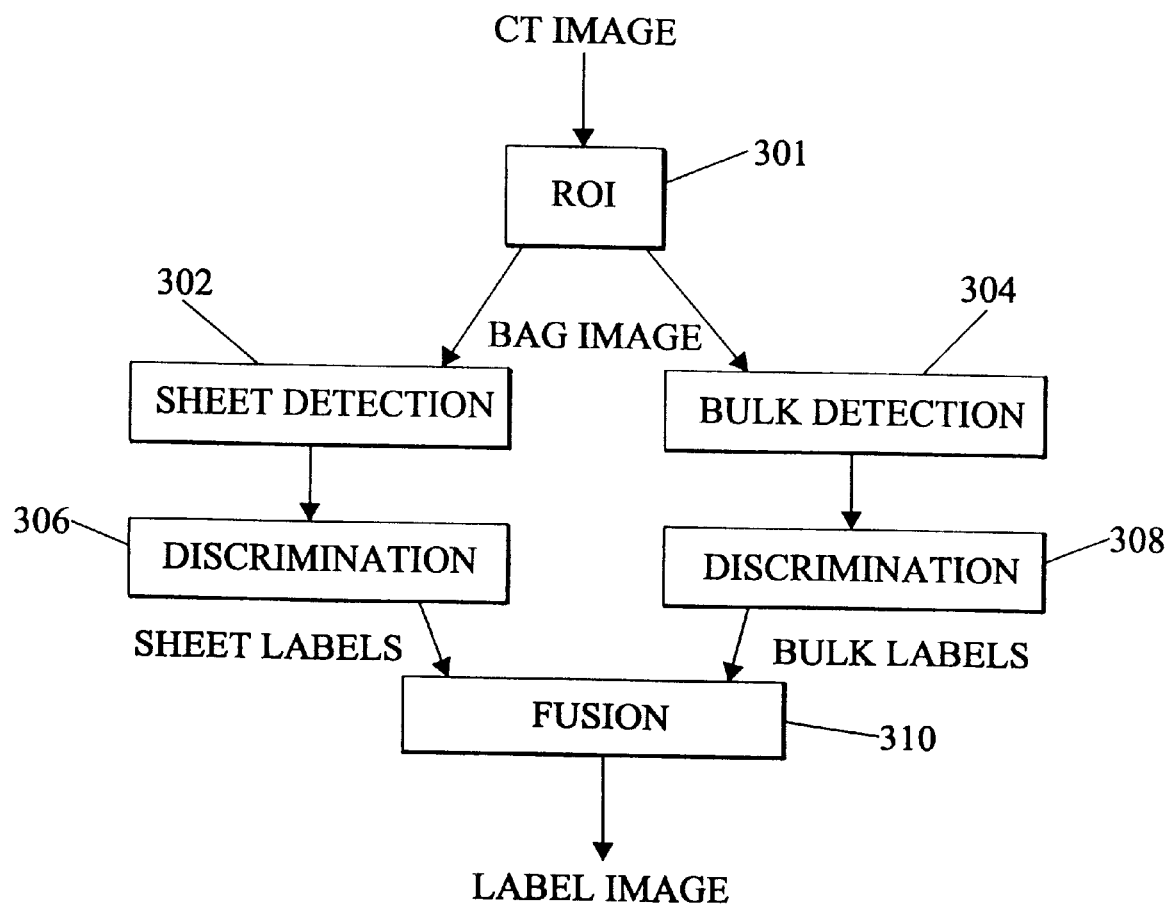
FIG. 5 contains a top-level flow diagram which illustrates the logical flow of one embodiment of the object identification method of the present invention.

FIG. 5 contains a top-level flow diagram which illustrates the logical flow of the overall object classification approach of one embodiment of the invention. In a first step 301, reconstructed CT image data are received and analyzed to define a region of interest (ROI) or bounding box for the region. This process eliminates voxels outside a bag and therefore reduces the size of the data set considerably. The method can then proceed along parallel paths including a sheet object detection path and a bulk object detection path.

Along the sheet detection path, sheet-shaped objects are detected in the sheet detection step 302. In the discrimination step 306, detected objects are analyzed to determine if they are threats. In one embodiment, this is done by comparing the mass of an object to a mass threshold. The discrimination step 306 produces label image data for the bag, which mark the voxels belonging to each sheet object and identify physical properties of each sheet object (preferably density and mass) and their position in the bag. The label image data for each voxel also include a number identifying the voxel according to an object with which it is identified or identifying the voxel as being background. The label image data are analyzed and processed in accordance with the invention to generate the two-dimensional projection of objects as described below in detail. The projections are then used to identify objects and alter the discrimination procedure accordingly.

Along the bulk detection path, bulk-type objects are detected in the bulk detection step 304. Next, in the discrimination step 308, the detected bulk objects are analyzed to determine if they are threats. The discrimination step 308 produces label image data for the bag, which marks the voxels belonging to each bulk object and identifies physical properties of each bulk object (preferably density and mass) and their position in the bag. As in the sheet path, the label image data can be analyzed and processed to produce two-dimensional projections of objects to alter the discrimination process.

The decision—data fusion step 310 of the method takes the label image data produced by sheet and bulk detection steps and computes a single label image that corresponds to detected explosives. It should be noted that instead of performing shape based object identification in the separate paths as described above, the final fused label image data can be so analyzed and processed.

The present invention analyzes two-dimensional projections, which in one embodiment are derived from eigenvectors and are therefore referred to herein as "eigen projections," of detected objects which can be considered to be two-dimensional elevation maps of the objects. These maps or projections can be generated by reducing the dimensionality of the CT data from three dimensions to two dimensions. In one embodiment, this reduction is done by finding the eigenvectors of the convariance matrix of the spatial locations of the voxels that make up the object under examination. In one embodiment, the label image data of the voxels are projected along the minimum eigenvector to form what is referred to as the best-view eigen projection. It is termed a "best view" because it is the projection that shows the largest portion of the object. However, projections can be generated along the other eigenvectors of the covariance matrix. Unless stated otherwise herein, all references to projections are to the best-view eigen projections.

In an alternative embodiment, eigenvectors are not used to produce the two-dimensional projection. In the alternative embodiment, the plane in which the projection is produced is selected to be the plane in which a two-dimensional projection of the object has its maximum area. In this case, it is assumed that the maximum area projection would best allow identification of the object. Either type of projection can be analyzed in accordance with the invention to identify an object and enhance the discrimination approach based on the object identification.

Figure 6:
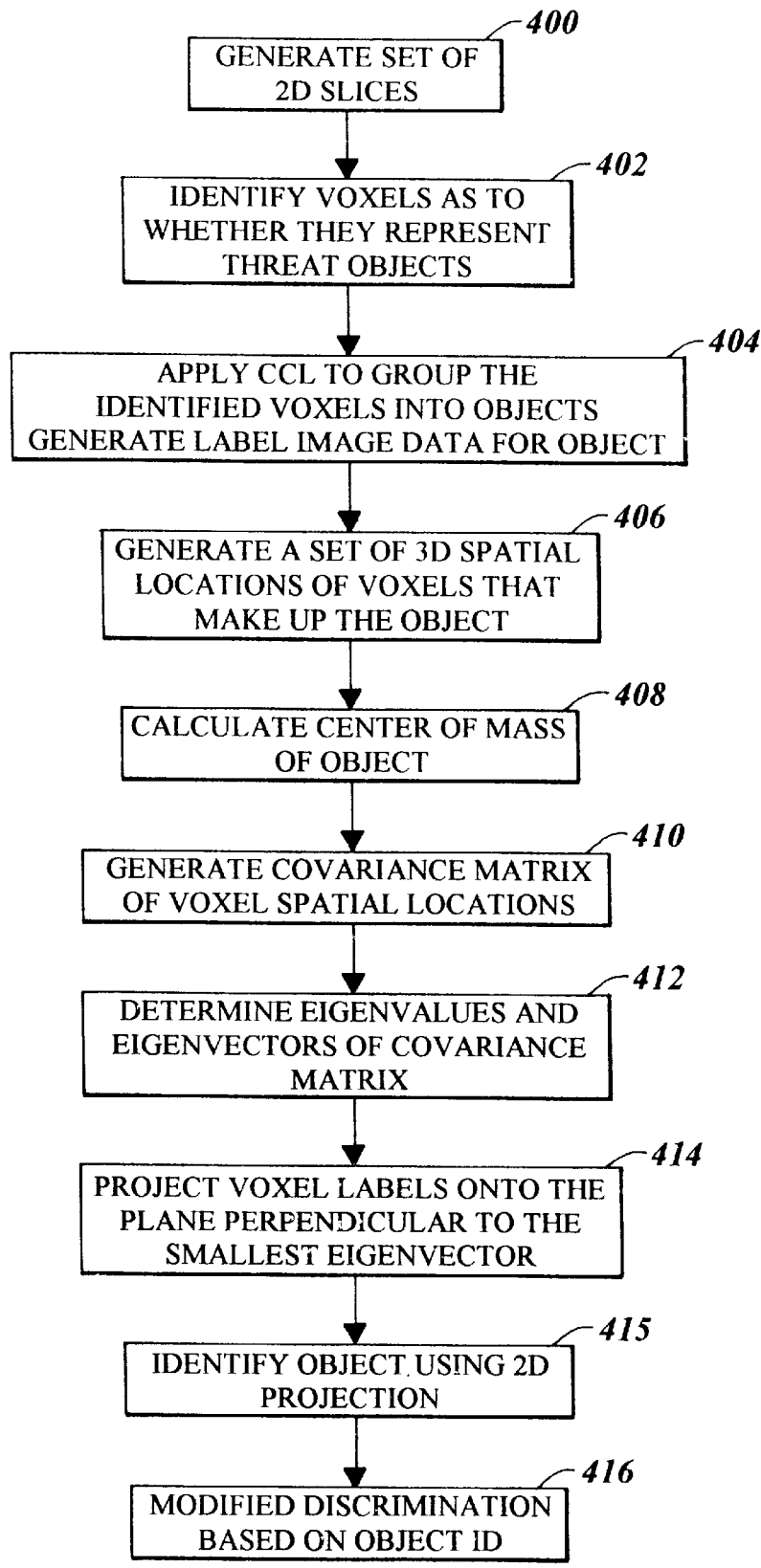
FIG. 6 contains a schematic flow diagram of the logical flow of generating a two-dimensional projection of an object in CT data in accordance with one embodiment of the present invention.

FIG. 6 contains a schematic flow diagram which illustrates the logical flow of the process of generating a two-dimensional projection of an object and modifying discrimination of the object in accordance with one embodiment of the present invention. As shown in step 400, the set of two-dimensional image slices is generated from CT data obtained for the region. Next, in step 402, the CT slices are scanned on a voxel-by-voxel basis to identify voxels that may be part of an explosive. This determination is made for each voxel based on the density of the voxel. In one embodiment, a constant false alarm rate (CFAR) method can be used to also determine if the voxel is part of a sheet-like object. Next, in step 404, CCL is applied to group the voxels into objects. This results in label image data being generated for objects in the region. It should be noted that the label image data can contain information about more than one object. To simplify the description, a single object will be referred to hereinafter. However, it will be understood that the description is applicable to data in which multiple objects are identified.

The following steps are used to generate the eigen projection from the label image data. In step 406, a set of three-dimensional spatial locations is generated for the voxels that make up the object. Next, in step 408, the center of mass of the object is found by averaging the elements of the set of spatial locations. In one particular embodiment, the actual density of the object is not considered, and the calculation assumes that the object is homogenous. Next, in step 410, the covariance matrix of the locations is determined by averaging the outer products of the labels after the center of mass has been subtracted. Next, in step 412, the eigenvalues and eigenvectors of the covariance matrix are determined. The eigenvalues are ranked according to their magnitudes, and the eigenvector corresponding to the smallest eigenvalue, i.e., the smallest eigenvector, is determined.

Next, in step 414, the voxel labels are projected onto the plane perpendicular to the smallest eigenvector. This projection is referred to herein as the eigen projection. In one embodiment, the projection is related to a count of the number of object voxels above or below a projection pixel in the direction of the selected eigenvector. In this case, the pixel values in the eigen projection are proportional to the object thickness along rays perpendicular to the projection plane. In this case, the projections therefore represent object shape, but not density. In an alternative embodiment, the projection pixels are computed using object voxel densities. For each projection pixel, the count can be computed using object voxels which are weighted according to their densities. It should be noted that the projection need not be computed along the smallest eigenvector. Information contained in projections along the other two eigenvectors can also be used in accordance with the invention.

Next, in step 415, the two-dimensional projection is used to identify the object or a class of objects to which the object belongs. This can be done by applying a known image processing technique such as template matching to the eigen projection. As a result, the object can be identified as being in a particular class of objects. Next, as illustrated in step 416, discrimination can be performed using modifications based on the object identification to classify the object as to whether it poses a threat. For example, a mass threshold can be raised or lowered to alter the discrimination process according to the type of object identified.

Computation of the eigen projection can also be used to improve the sheet detection approach used in the system. Pixel values in the eigen projection are proportional to the thickness of an object. Sheets, by definition are thin objects. Therefore, where the pixel values in the eigen projection reflect a relatively thin object, a sheet may be indicated. Statistical measures of the spatial-dependant eigen projection thickness can be indicative of sheet-like objects. These considerations can be used to reduce false alarms in the sheet detection path of the detection process.

Some parts of bags are thin and can be confused with sheets by the sheet detection process. Examples include pull-out handles and plastic reinforcements that extend around the perimeter of the bag. These parts can be found in the eigen projection by first finding the spatial extent, i.e., the bounding box, of the eigen projection. Then, the percentage of pixels covered by the eigen projection in the bounding box can be calculated. Low values of this measure can be indicative of bag parts, and this information can be used during subsequent discrimination steps.

The use of two-dimensional projections also allows for manual clearing of objects in bags. In one embodiment, the eigen projection can be presented on a display viewed by the operator. The operator can make a conclusion as to the identity of the object in the bag. This conclusion can indicate that the bags should be cleared as not containing any threats.

Also, various views of objects can be produced on different planes at different angles with respect to the axes of the object. For example, cross-sectional views of the object can be viewed in a plane perpendicular to the main axis of the object. This allows the object to be more readily identified. It also allows for inspection of the interior of the item. Again, as a result of these displays, the operator can manually clear a bag as not containing a threat.

The details of generating the two-dimensional eigen projections in accordance with the invention will now be described in detail. The spatial coordinates of the voxels of the label image for an object are a set of N triplets denoted r. The elements of the set are given by $r_i=(x_i, y_i, z_i)^T$, where vector names are in bold font, the superscript T indicates transpose, and $0 \leq i < N$. The values of $x_i$, $y_i$ and $z_i$ are integers corresponding to array indices.

The center-of-mass, $\bar{r}$, is calculated by $$\bar{r} = \frac{1}{N}\sum_{i=0}^{N-1} r_i.$$

The covariance matrix, S, is formed using the outer product $$S = \frac{1}{N}\sum_{i=0}^{N-1} (r_i - \bar{r})(r_i - \bar{r})^T.$$

The three eigenvalues of S, $(\lambda_0, \lambda_1, \lambda_2)$, are computed by solving the following third-order equation in $\lambda$.

$|\lambda I - S| = 0$, where I is a 3×3 identity matrix, and the function $|x|$ denotes the determinant of its argument, x. The eigenvectors, $(e_0, e_1, e_2)$, of the covariance matrix S are computed by $(\lambda_0 I - S)e_0 = 0$ $(\lambda_1 I - S)e_1 = 0$ $(\lambda_2 I - S)e_2 = 0$ The eigenvalues are ranked according to their magnitude, resulting in $(\lambda_{max}, \lambda_{med}, \lambda_{min})$, where max, med, and min denote maximum, medium, and minimum, respectively. The corresponding eigenvalues are renamed as $(e_{max}, e_{med}, e_{min})$.

The eigen projection along $e_{min}$ is found using the following steps. It is noted that other eigen projections along $e_{max}$ and $e_{med}$ can also be computed. Let the array E (l, m) be the eigen projection.

1. Initalize the elements of E(l, m) to zero.
2. For each label $r_i$, calculate $l = \lfloor r_i \cdot e_{med} \rfloor$ $m = \lfloor r_i \cdot e_{max} \rfloor$, where $\lfloor x \rfloor$ is the greatest integer less than or equal to x, and "." denotes the inner product or dot product.

3. Increment the value of E(l, m) by one.

$E(l,m) \rightarrow E(l,m)+1$

The eigen projections along the other two eigenvectors can be obtained by changing the definition of (l, m) above to $l = \lfloor r_i \cdot e_{min} \rfloor$ $m = \lfloor r_i \cdot e_{max} \rfloor$ or $l = \lfloor r_i \cdot e_{min} \rfloor$ $m = \lfloor r_i \cdot e_{med} \rfloor$ The size of the arrays containing the eigen projections can be determined by projecting the corners of the bounding box of the object along the three eigenvectors. The indices of the array are positive in most computer languages. Therefore, an offset of half the size of the array is added to the values found above for l and m.

As described in detail above, in a preferred embodiment of the invention, a two-dimensional projection of a selected object can be used to provide an identification of the object or a class of objects to which the selected object belongs. This identification can be used to alter the discrimination process, such as by altering discrimination parameters such as mass thresholds, to provide for enhanced system performance in the form of reduced false alarm rate and/or increased detection rate. In an alternative embodiment, the two-dimensional projection can be considered to provide an identification of an object based on its shape. This shape-based identification can then be used to classify the object as to whether it poses a threat. For example, the shape of an object can identify it as being a harmless item commonly found in passenger baggage. The identification of the harmless object can be used to directly classify it as a non-threat object, without carrying out any kind of discrimination based on mass, density and/or other parameters. Thus, where desired, the invention can be used to provide shape-based object identification and/or discrimination.

While this invention has been particularly shown and described with references to preferred embodiments thereof, it will be understood by those skilled in the art that various changes in form and details may be made therein without departing from the spirit and scope of the invention as defined by the following claims. The invention is applicable to detection and/or classification of objects of various types and shapes. For example, the invention can be used to detect and/or classify sheet-shaped objects and bulk objects.

What is claimed is:

1. A method of detecting objects represented in three-dimensional reconstructed computed tomography (CT) data acquired within a three-dimensional region defined by a three-dimensional scanning coordinate system, comprising:

identifying object volume elements from the volume elements of the three-dimensional reconstructed CT data so as to define volume elements constituting an entire object;

identifying three axes defined by eigenvectors associated with the entire object; and generating a two-dimensional projection from three-dimensional reconstructed CT data of the entire object in a plane associated with one of the three axes defined by the eigenvectors associated with the entire object; wherein the plane in which the two-dimensional projection is generated is a plane in which the two-dimensional projection has maximum area;

wherein the plane in which the two-dimensional projection has maximum area is identified by searching solid angles over a hemisphere in the three-dimensional region defined by the three-dimensional scanning coordinate system.

2. A method of detecting objects represented in three-dimensional reconstructed computed tomography (CT) data acquired within a three-dimensional region defined by a three-dimensional scanning coordinate system, comprising:

identifying object volume elements from the volume elements of the three-dimensional reconstructed CT data so as to define volume elements constituting an entire object;

identifying three axes defined by eigenvectors associated with the entire object; and generating a two-dimensional projection from three-dimensional reconstructed CT data of the entire object in a plane associated with one of the three axes defined by the eigenvectors associated with the entire object;

wherein the two-dimensional projection of the object comprises a plurality of projection pixels;

each projection pixel is associated with a density value; and the density value of each projection pixel corresponds to a count of a number of object volume elements in a direction of the axis defined by the object, each object volume element in a count being weighted by a density value associated with the volume element.

3. An apparatus for detecting objects represented in three-dimensional reconstructed computed tomography (CT) data acquired within a three-dimensional region defined by a three-dimensional scanning coordinate system, comprising:

an object identifier that (a) identifies object volume elements from the volume elements of the three-dimensional reconstructed CT data so as to define volume elements constituting the entire object; (b) identifies three axes defined by eigenvectors associated with the entire object; and (c) generates a two-dimensional projection from three-dimensional reconstructed CT data of the entire object in a plane associated with one of the three axes defined by the eigenvectors associated with the entire object;

wherein the plane in which the two-dimensional projection is generated is a plane in which the two-dimensional projection has maximum area; and the plane in which the two-dimensional projection has maximum area is identified by searching solid angles over a hemisphere in the region defined by the three-dimensional scanning coordinate system.

4. An apparatus for detecting objects represented in three-dimensional reconstructed computed tomography (CT) data acquired within a three-dimensional region defined by a three-dimensional scanning coordinate system, comprising:

an object identifier that (a) identifies object volume elements from the volume elements of the three-dimensional reconstructed CT data so as to define volume elements constituting the entire object; (b) identifies three axes defined by eigenvectors associated with the entire object; and (c) generates a two-dimensional projection from three-dimensional reconstructed CT data of the entire object in a plane associated with one of the three axes defined by the eigenvectors associated with the entire object;

wherein the two-dimensional projection of the object comprises a plurality of projection pixels;

each projection pixel is associated with a density value; and the density value of each projection pixel corresponds to a count of a number of object volume elements in a direction of the axis defined by the object, each object volume element in a count being weighted by a density value associated with the volume element.

5. An apparatus for detecting objects represented in three-dimensional reconstructed computed tomography (CT) data acquired within a three-dimensional region defined by a three-dimensional scanning coordinate system, comprising:

means for identifying object volume elements from the volume elements of the three-dimensional reconstructed CT data so as to define volume elements constituting an entire object;

means for identifying three axes defined by eigenvectors associated with the entire object; and means for generating a two-dimensional projection from three-dimensional reconstructed CT data of the entire object in a plane associated with one of the three axes defined by the eigenvectors associated with the entire object;

wherein the plane in which the two-dimensional projection is generated is a plane in which the two-dimensional projection has maximum area; and the plane in which the two-dimensional projection has maximum area is identified by searching solid angles over a hemisphere in the three-dimensional region defined by the three-dimensional scanning coordinate system.

6. An apparatus for detecting objects represented in three-dimensional reconstructed computed tomography (CT) data acquired within a three-dimensional region defined by a three-dimensional scanning coordinate system, comprising:

means for identifying object volume elements from the volume elements of the three-dimensional reconstructed CT data so as to define volume elements constituting an entire object;

means for identifying three axes defined by eigenvectors associated with the entire object; and means for generating a two-dimensional projection from three-dimensional reconstructed CT data of the entire object in a plane associated with one of the three axes defined by the eigenvectors associated with the entire object;

wherein the two-dimensional projection of the object comprises a plurality of projection pixels;

each projection pixel is associated with a density value; and the density value of each projection pixel corresponds to a count of a number of object volume elements in a direction of the axis defined by the object, each object volume element in a count being weighted by a density value associated with the volume element.

* * * * *